Aug. 30, 1960 M. P. SCHOLZ 2,950,866
TEMPERATURE REGULATED VALVE ASSEMBLY
Filed Dec. 22, 1958 2 Sheets-Sheet 2
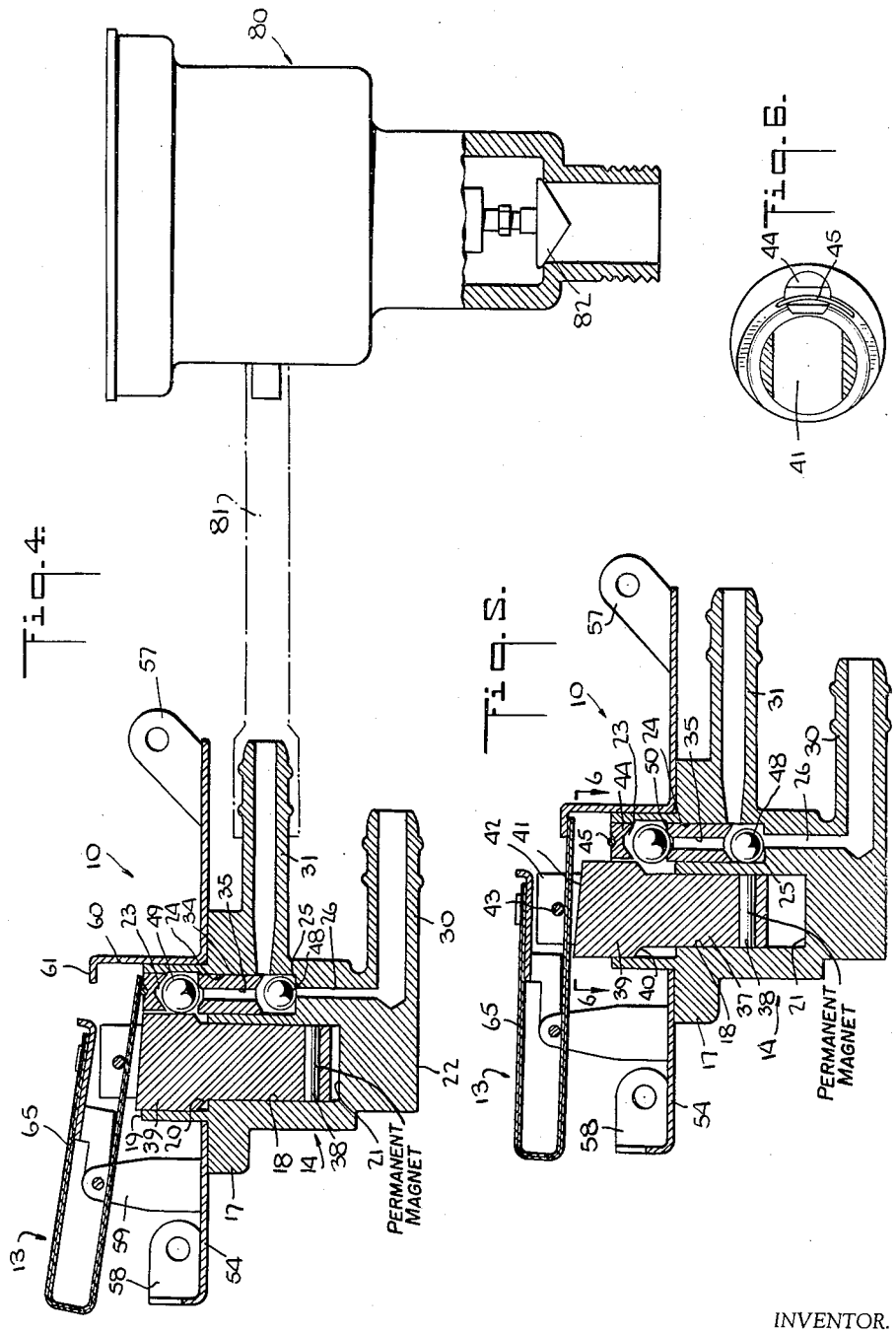
INVENTOR.
MICHAEL PETER SCHOLZ
BY Mock & Blum
ATTORNEYS United States Patent Office 2,950,866
Patented Aug. 30, 1960

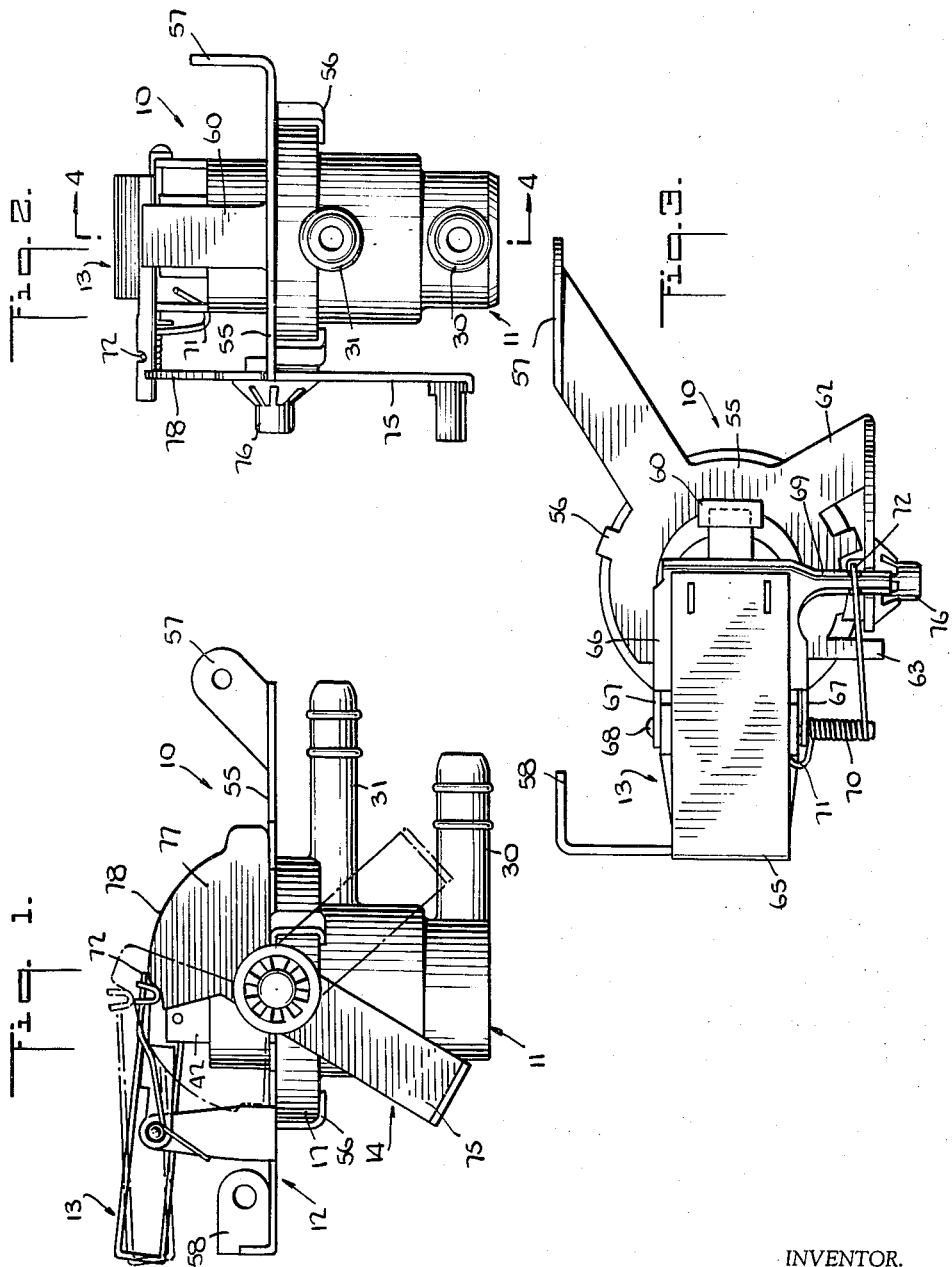

2,950,866

TEMPERATURE REGULATED VALVE ASSEMBLY

Michael Peter Scholz, Cranford, N.J., assignor to Paragon Products Corporation, Newark, N.J., a corporation of New Jersey Filed Dec. 22, 1958, Ser. No. 782,239

1 Claim. (Cl. 236—87)

This invention relates generally to temperature control devices, and is especially concerned with a novel and improved temperature regulator valve assembly.

While the control device of the present invention has been primarily developed and employed for use in a vehicle in conjunction with a vacuum motor, and will be illustrated and described hereinafter with particular reference thereto, it is appreciated that the instant device is capable of other applications, all of which are intended to be comprehended herein.

It is one object of the present invention to provide a highly simplified and improved control device of the type described which is durable and entirely reliable under all conditions of use, and which can be economically manufactured for sale at a reasonable price.

As is well known to those versed in the art, prior devices of the instant type have been relatively complex in construction, requiring numerous intricate component parts so as to be difficult in assembly, and resulting in devices of undue complexity, relatively high cost, and too readily subject to mal-functioning.

It is therefore another object of the present invention to provide a control device which overcomes the difficulties mentioned in the preceding paragraph and considerably reduces in number the required parts, such parts being relatively simple in their structure and cooperating relationship, for enhanced utility and serviceability.

As one important application of the invention, the control device, in conjunction with a vacuum motor, may be used to control the flow of hot water into an automobile heater. However, the invention is not limited to this application.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claim.

In the drawings:

Fig. 1 is an elevational view showing a control device of the present invention, apart from the controlled apparatus, an alternate position of adjustment for temperature being shown in dot-and-dash outline;

Fig. 2 is an elevational view of the control of Fig. 1 taken from the right side thereof;

Fig. 3 is a top plan view of the device of Figs. 1 and 2;

Fig. 4 is an elevational view, partly in section, showing the control device of Figs. 1–3 in operative association with a vacuum motor, and illustrating one extreme position of adjustment of the control device;

Fig. 5 is a view similar to Fig. 4, showing the control device in the other extreme or opposite of adjustment; and Fig. 6 is a partial sectional view taken substantially along the line 6—6 of Fig. 5.

Referring now more particularly to the drawings, and specifically to Figs. 1–3 thereof, the control device of the present invention is there generally designated 10 and includes a body 11 having a bracket 12 affixed thereto, which carries a heat responsive element 13, such as a bimetal strip. An adjustment mechanism 14 is carried by the body 11, exteriorly thereof, in operative connection with the bimetal 13.

The body 14 is generally vertically elongate and provided with a generally circular, horizontally disposed, external enlargement or annular flange 17 adjacent to and spaced below the upper body end for attachment to the bracket 12. As best seen in Figs. 4 and 5, the generally vertically disposed body 14 is formed with a vertically elongate internal bore, hole or cavity 18 of generally cylindrical configuration. Stated otherwise, the hole or hollow 18 of the body 14 extends downward into the latter through the upper body end 19, being reduced at an upwardly facing, internal shoulder 20 approximately coplanar with the upper surface of the outer enlargement 17, and thence extending downward, terminating at a generally flat bottom wall 21 spaced from the lower end 22 of the body.

The body 14 is further formed with a generally vertical cylindrical bore or hole 24 extending downward from the upper body surface 19, defining an upper chamber 23 opening laterally into the upper enlarged region of hole 18, and extending thence downward along side of the reduced lower region of bore 18, being spaced from the latter. At a location spaced above the bottom wall 21 of the bore 18, the bore 24 is reduced, defining an annular upwardly facing shoulder 25, and extends downward from the latter shoulder, as at 26, beyond the lower end or bottom wall 21 of the bore 18. Thus, the bore 24 and its reduced lower region 26 extend internally of the body 14 along side of and spaced from the bore or hole 18, while the bore 24 opens upward through the hollow region 23 and exteriorly through the upper body end 19.

Extending laterally from the lower region of body 14, rightward as seen in Figures 1, 4 and 5, is a tube or nipple 30 having its inner end opening into the lower end of reduced bore 26. An upper nipple or tube 31 projects laterally rightward from the body 14, having its inner end opening into the bore 24 at a location adjacent to and spaced above the shoulder 25. Fixed internally within the bore 24, at a location spaced above the shoulder 25 is a vertically disposed, open ended tube or sleeve 34 having a longitudinally extending through bore 35. The sleeve or tube 34 may have its lower end adjacent to and at least partially above the opening of the nipple 31 into the bore 24, so as not to be close to the latter opening, while the upper end of sleeve 34 may be located in the lower portion of the hollow region 23, spaced slightly above the shoulder 20, and facing upward into the latter hollow region. As best seen in Fig. 6, the bore 18 and the upper region 23 of bore 24 are both of generally circular horizontal cross sectional configuration with their center to center distances less than the sum of their radii so as to open laterally into each other.

Received in the bore 18 is an elongate operating element or plunger 37 having a permanent magnet 38 imbedded therein adjacent to its lower end. The plunger 37 is slidably received in the lower reduced portion of the bore 18, and has its upper region 39 enlarged for sliding reception in the enlarged upper region of the bore. Thus, the enlarged upper plunger region 39 projects laterally into the adjacent upper region 23 of the bore 24. A generally conical or downwardly tapering portion 40 may be provided connecting the upper enlarged plunger portion 39 with the remainder of the plunger 37. The upper plunger surface 41 may be generally flat and decline slightly toward the internal body region 23, being located exteriorly of the body in both its lower and upper positions of Figs. 4 and 5, respectively. Projecting upward from the upper plunger surface 41 are a pair of spaced lugs 42, between which extends a generally horizontal pin 43 having its opposite ends secured in the upstanding lugs and spaced over the upper plunger surface 41. A plug 44 is loosely engaged in the uppermost portion of body region 23, directly above and spaced over the tube 34, being cut out to receive the adjacent enlarged portion 39 of the plunger 37 and configured to pass fluid from the ambient atmosphere to the interior of body region 23. A retaining member 45 may be fixed to the upper surface of the body 14 and overlie the plug 44 to prevent its removal.

Loosely received in the bore 24, between the upwardly facing shoulder 25 and the lower end of the tube 34 is a spherical valve element 48, fabricated of magnetically permeable material. The spherical valve element or ball 48 is of a size capable of lateral movement in the bore 24, as between the positions of Figs. 4 and 5. In the former figure, the valve element 48 is seated on the shoulder 25 directly over and in closing relation with respect to the upper end of bore 26, while in Fig. 5, the valve element has been shifted laterally out of the above described seating relationship, to open the bore 26. Thus, it will be appreciated that the shoulder 25 defines a valve seat, while the ball 48 is movable laterally into and out of seated closing relation with respect to the seat.

A spherical valve element or ball 49 is loosely received in the region 23 beneath the plug 44 and the tube 34. More specifically, the valve element or ball 49 is movable in the region 23 laterally between the position of Fig. 4, wherein the ball is engaged by the enlarged upper plunger portion 39 and thereby shifted laterally rightward out of alinement with the bore 35 of tube 34, and the position of Fig. 5 wherein the enlarged upper plunger portion 39 has been elevated beyond engagement with the ball 49 to release the latter and permit its alinement with the bore 35 seating on the upper end surface 50 of the tube 34 in closing relationship with the bore. Thus, the upper end surface 50 of the tube 34 defines a valve seat adapted to be closed and opened by seating and unseating thereon of the ball 49.

The bracket 12 includes a generally flat plate 54 having a central annular portion 55 circumposed about the upper region of the body 14 and seated on the upper surface of the body enlargement 17, being secured to the latter by holding tabs 56. In addition, upstanding securement tabs 57 and 58 are formed on the plate 54 for fastening the control device 10 to a supporting surface.

Also formed on the plate 54, on the side of the body 14 remote from the nipples 30, 31, and projecting upward from the plate, are a pair of spaced journal posts or arms 59. On the opposite side of the body 14 as the upstanding arms 59, and contiguous to the body, a leg 60 projects upward from the plate 54 and is provided on its upper end with a lip 61 bent to spacedly overlie the plug 44. As best seen in Fig. 3, a pair of extensions 62 and 63 project from the plate 54, substantially coplanar with the plate generally radially from the annular plate portion 55 at spaced locations thereabout.

The temperature responsive element 13 includes a bimetallic strip 65 bent into a generally U-shaped configuration and arranged with one leg spaced above the other. The lower leg of the bimetallic strip is disposed generally between the upstanding arms or journal posts 59, with the free end of the lower leg extending between the retaining pin 43 and upper plunger surface 41, and terminating at a location over the plug 44. The upper leg of the U-shaped bimetallic element 65 has affixed to its free end a plate 66 disposed generally over the plunger 37 and provided with a pair of spaced arms 67 each extending from the plate 66 toward the bight portion of the bimetal and each terminating adjacent to a respective arm 59. A pivot pin 68 extends generally horizontally through all of the arms 67 and 59, between the legs of the bimetal, to thereby mount the thermostatic element for pivotal movement about the axis of the pin.

Adjacent to the free end of the upper leg of the bimetallic element 65, the plate 66 is provided with an extension 69 generally parallel to the pin 68 and spaced from the latter. A coil spring 70 is helically circumposed about one end portion of the pin 68 beyond an arm 67, and has its opposite end portions 71 and 72 in respective engagement with the adjacent arm 59 and the extension 69. By the uncoiling tendency of the spring 70 and its end connections, the spring serves to resiliently urge the thermostatic element 13 about the axis of pin 68 in the direction tending to engage with the upper plunger surface 41 and move the latter downward, in the clockwise direction as seen in Figs. 4 and 5.

A crank arm or lever 75 is mounted by a pivotal connection 76 exteriorly on the body 14, and thereby rotatable about an axis generally parallel to that of the pivot pin 68 and approximately normal to that of longitudinal plunger movements. The pivotal connection 76 is advantageously provided on the body enlargement 17 approximately directly beneath the extension 69 of plate 66, and the arm 75 is disposed generally below the pivotal connection. Carried by the arm 75 and located above the pivotal connection 76 is a cam 77 having a cam edge 78 in engagement with the extension 69 of plate 66. As the surface of edge 78 is at varying distances from the axis of pivotal connection 76, the extension 69, which is retained in engagement with the cam edge 78 by the action of spring 70, will be located at different elevations above the pivotal connection corresponding to different angular positions of the arm 75 and cam 70. Of course, the bimetallic strip 65 will therefore be adjustably positionable angularly about the axis of pivot pin 68. The plate extension 62 and 63 provide abutments for engagement with the cam 77 in limiting positions of the latter, as seen in the solid and phantom positions of Fig. 1.

A vacuum motor, generally designated 80, is shown in Fig. 4, in fluid communication with the interior of nipple 31, as by a fluid conduit 81. The vacuum motor 80 may be any fluid operated motor, and in the instant case is a vacuum motor operable upon an increase in vacuum communicated to the motor through the nipple 31 to effect opening movement of a valve 82.

In operation, the nipple 30 is connected to a vacuum source, such as the manifold of a vehicle engine. Thus, the bore 26 and lower region of bore 24 below the tube 34 may be considered as a passageway having its opposite ends, namely the nipples 30 and 31, communicable respectively with a vacuum source and a vacuum motor. Further, the shoulder 25 constitutes a valve seat facing away from the vacuum source. The bore 35 of tube 34 and the interior region 23 above the upper end of tube 34 may be considered as a branch passageway having its upper end opening to the atmosphere, as by bypassing the loosely received plug 44, and having its lower end in fluid communication with the region of bore 24 below tube 34.

In the condition illustrated in Fig. 4, the magnet 38 is relatively remote from the magnetically permeable ball valve element 48, so as to exert little or no force upon the latter against its natural tendency to seat on and close the valve seat 25. Thus, vacuum is prevented from passing to the motor 80. Rather, the enlarged upper plunger portion 39 is in engagement with the upper ball valve element 49, dislodging and retaining the latter out of closing relation with the valve seat 50, so that atmospheric pressure is communicated through the bore 35 and to the vacuum motor 80. This effects operation of the vacuum motor in a manner to close the valve 82, such as may be employed to stop the circulation of heating fluid to a heater.

In the condition of Fig. 5, the magnet 38 is relatively close to the lower ball valve element 48, thereby exerting a considerable magnetic force on the latter, sufficient to resist seating of the latter and open the valve seat 25. This communicates the vacuum source through the valve seat into the bore 24. As the upper enlarged plunger portion 39 is located out of engagement with the upper ball valve 49, the latter is free to seat on and in closing relation with the valve seat 50, under the resultant force of a vacuum. Thus, the vacuum is communicated through the nipple 31 to the vacuum source to open the valve 82, say to pass heating fluid to a heater.

While Figs. 4 and 5 show extreme positions of adjustment of the temperature responsive element 13 about its pivotal mounting pin 68, corresponding to the solid and dashed outline positions of Fig. 1, it is obvious that the arm 75 may be swung to any selected angular position, to place the bimetallic strip 65 in a desired angular position about its pivotal mounting. This consequently locates the plunger 37 vertically in the bore 18 for movement therein upon changes in temperature through a desired range for effecting operation of the ball valve element 48 and 49, as described hereinbefore.

From the foregoing, it is seen that the present invention provides a temperature control device which fully accomplishes its intended objects, and is well adapted to meet practical conditions of manufacture, maintenance and use.

Although the present invention has been described in some detail by way of illustration and example for purposes of clarity of understanding, it is understood that certain changes and modifications may be made within the spirit of the invention and scope of the appended claim.

What is claimed is:

In a temperature control for operating a vacuum motor, the combination comprising a body provided with an internal passageway having opposite ends adapted for respective connection to a vacuum source and a vacuum motor, a first valve seat in said passageway, a first valve member fabricated of magnetically permeable material received in said passageway and movable into and out of seating relation with said first valve seat for respectively closing and opening said vacuum source to said vacuum motor, said body being provided with a branch passageway having its opposite ends respectively connected with the atmosphere and said first-mentioned passageway between said first valve element and said vacuum motor, a second valve seat in said branch passageway, a second ball-like valve element in said branch passageway and movable into and out of seating relation with said second valve seat for respectively closing and opening said first passageway to the atmosphere, an operating element arranged in said body externally of said first passageway with spaced regions of said member respectively contiguous to said first and second valve elements and mounted for back and forth longitudinal movement in said body relative to said valve elements responsive to temperature conditions to be controlled, a magnet carried by said elongate member for movement therewith and located externally of said first-mentioned passageway, said magnet being positioned to attract said first valve element out of its seating relation in one direction of the back and forth movement of said operating element and to permit seating of said first valve element in the other direction of said back and forth movement, said operating element also carrying a projection extending into said branch passageway, said projection being engageable with said second valve element to prevent seating thereof when said operating element is moved in said other direction, said projection being out of engagement with said second valve element to permit seating thereof in said one direction of said back and forth movement.

References Cited in the file of this patent

UNITED STATES PATENTS

| 2,231,158 | Davis | Feb. 11, 1941 |
| 2,576,168 | Allen | Nov. 27, 1951 |
| 2,724,555 | Roetter | Nov. 22, 1955 |
| 2,815,175 | Swenson | Dec. 3, 1957 |
| 2,868,459 | Modes | Jan. 13, 1959 |